United States Patent
Sedky et al.

(10) Patent No.: US 7,969,610 B2
(45) Date of Patent: Jun. 28, 2011

(54) NOTIFICATION METHODS AND SYSTEMS FOR PRINT-RELATED SYSTEMS

(75) Inventors: Khaled S. Sedky, Sammamish, WA (US); Feng Yue, Sammamish, WA (US); Harvinder Pal Singh, Redmond, WA (US); Adina M. Trufinescu, Redmond, WA (US); Adrian F. Maxa, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1314 days.

(21) Appl. No.: 11/096,856

(22) Filed: Apr. 1, 2005

(65) Prior Publication Data
US 2006/0224606 A1    Oct. 5, 2006

(51) Int. Cl.
*G06F 3/12*  (2006.01)
*G06F 15/16* (2006.01)
*G06F 3/00*  (2006.01)

(52) U.S. Cl. ....... 358/1.5; 358/1.13; 358/1.15; 709/202; 709/203; 710/10; 710/18; 710/19

(58) Field of Classification Search ............ 719/328
See application file for complete search history.

(56) References Cited

U.S. PATENT DOCUMENTS

| | | | |
|---|---|---|---|
| 6,934,046 B1* | 8/2005 | Nishikawa et al. | 358/1.15 |
| 7,084,994 B1* | 8/2006 | Koppich et al. | 358/1.15 |
| 7,202,972 B1* | 4/2007 | Schwier et al. | 358/1.9 |
| 7,460,260 B2* | 12/2008 | Garg | 358/1.15 |
| 2002/0041395 A1* | 4/2002 | Kimura | 358/1.15 |
| 2002/0089692 A1* | 7/2002 | Ferlitsch | 358/1.15 |
| 2003/0076527 A1* | 4/2003 | Simpson et al. | 358/1.15 |
| 2003/0103235 A1* | 6/2003 | Gomi | 358/1.15 |
| 2003/0137691 A1* | 7/2003 | Tanaka | 358/1.15 |
| 2004/0032611 A1* | 2/2004 | Daly et al. | 358/1.13 |
| 2004/0111418 A1* | 6/2004 | Nguyen et al. | 707/100 |
| 2005/0038886 A1* | 2/2005 | Garg | 709/224 |
| 2005/0044200 A1* | 2/2005 | Aritomi | 709/223 |
| 2005/0141023 A1* | 6/2005 | Yagita et al. | 358/1.15 |
| 2005/0254084 A1* | 11/2005 | Imoto | 358/1.15 |

FOREIGN PATENT DOCUMENTS
WO    WO2004077287    *  9/1994

OTHER PUBLICATIONS http://support.microsoft.com/kb/240683.*

* cited by examiner

*Primary Examiner* — Benny Q Tieu
*Assistant Examiner* — Haris Sabah
(74) *Attorney, Agent, or Firm* — Lee & Hayes, PLLC (57) ABSTRACT

Notification mechanisms for use in connection with print systems are described. In one embodiment, a notification mechanism extends from a printing application to the spooler, from the spooler to a hosting process, and back to the spooler. The notification mechanism can allow interested applications, such as print user interfaces, to register to receive updates on the progress of a print job. The notification mechanism provides a very rich and robust mechanism through which notifications can be generated and received.

16 Claims, 4 Drawing Sheets

NOTIFICATION METHODS AND SYSTEMS FOR PRINT-RELATED SYSTEMS

TECHNICAL FIELD

This invention pertains to notification methods and systems for print-related systems and related components that are involved in the printing process.

BACKGROUND

During the printing process, certain applications such as monitoring applications like print user interfaces, can receive notifications that pertain to the printing process. To date, typical notifications are very basic and simple. For example, a spooler (simultaneous peripheral operations on-line), which is typically used to write contents of a print job to a file on a disk, may generate a notification that it has finished processing a page. However, this is generally where the richness and granularity of the notification process stops.

Accordingly, this invention arose out of concerns associated with providing improved notification methods and systems for print-related systems.

SUMMARY

Notification mechanisms for use in connection with print systems are described. In one embodiment, a notification mechanism extends from a printing application to the spooler, from the spooler to a hosting process, and back to the spooler. The notification mechanism can allow interested applications, such as print user interfaces, to register to receive updates on the progress of a print job. The notification mechanism provides a very rich and robust mechanism through which notifications can be generated and received.

DETAILED DESCRIPTION

Overview

In the embodiments described below, a notification mechanism is described that extends from a printing application to the spooler, from the spooler to a hosting process and back to the spooler. The notification mechanism can allow interested applications, such as print user interfaces, to register to receive updates on the progress of a print job. The notification mechanism provides a very rich and robust mechanism through which notifications can be generated, as will become apparent below.

Figure 1:
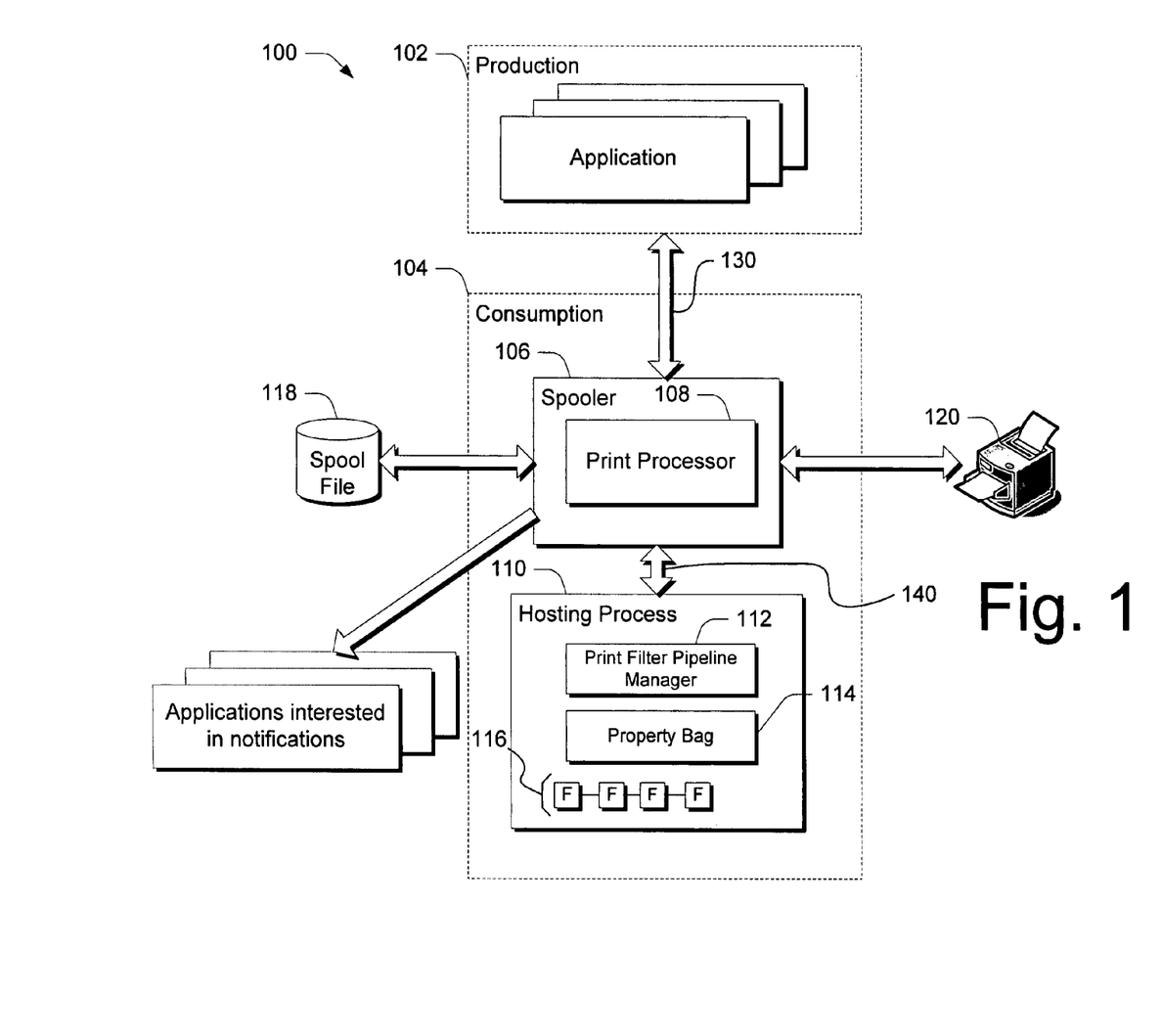
FIG. 1 is a high level diagram of an exemplary system having production side and consumption side components in accordance with one embodiment.

As but one example of a system in which the inventive principles can be employed, consider FIG. 1. There, a system 100 comprises what are referred to as production side components 102 that include one or more applications, and consumption side components 104 that comprise, in this example, a spooler 106, a print processor 108 and a hosting process 110 that includes a print filter pipeline manager 112, a property bag 114 and a collection of filters 116 (designated "F"). Although the collection of filters is illustrated as part of the hosting process, such need not necessarily be the case. For example, in alternate designs, one or more filters may run inside the spooler process and/or in the application space. In addition, a spool file 118, which comprises data that is passed from the production side to the consumption side, is provided. In addition, system 100 includes one or more print devices or printers 120.

In this example, one or more applications on the production side create or produce a print job which is then sent to the consumption side components for processing or consumption. An application typically executes on a client and can be, for example, an application on a computer that is connected with a network.

On the consumption side, spooler 106 is the component that receives, processes, schedules, and distributes print jobs for printing. Print spoolers typically comprise a collection of dynamic-link libraries (DLLs) that receive and process a print job. These DLLs, depending on the spooler implementation, can include routing DLLs, local and remote print provider DLLs, print processing DLLs and print monitor DLLs.

In processing a print job, one of the processes performed by the spooler is spooling, which refers to the process of writing the contents of a print job to a file on a disk, such as spool file 118.

In the illustrated example, spooler 106 includes a print processor 108 which can be implemented, as noted above, as one or more DLLs. Typically, the print processor works in conjunction with a set of print filters to despool the spooled print jobs during print spool file playback, make any modifications or alterations to the print jobs and send the print jobs to a printing device, such as device 120. In the illustrated and described embodiment, the hosting process 110 includes a print filter pipeline manager 112 that manages filter collection 116, as well as a property bag 114 that is discussed in more detail below.

In this particular example, two notification channels or pipes 130, 140 are illustrated—one between the application(s) on the production side 102 (as well as other applications interested in notifications) and spooler 106, and another between the hosting process 110 and the spooler 106. It is to be appreciated and understood that multiple notification pipes can be utilized and that the two illustrated and described notification pipes should not be used to limit application of the claimed subject matter to only two notification pipes which are located between the application and spooler, and between the spooler and hosting process.

The notification pipes provide a mechanism by which a rich set of notifications can be sent to other components throughout the various processing stages of the print job. These notifications may be generated by various components involved in the creation and processing of a job. More specifically, in this embodiment, notification pipe 130 will send notifications generated by the applications to the spooler process 106, components within the spooler process and to any other process that has registered to receive notifications, and in the opposite direction. Notification pipe 140 will send notifications either generated by the spooler or received by the spooler from the applications to hosting process 110, components within the hosting process and to any other process that has registered to receive those notifications, and in the opposite direction.

In the illustrated and described embodiment, the notification pipes can be implemented as a set of managed or unmanaged APIs that are present in the application address space that are triggered and used by the applications during the process of creating or producing a printable job. In addition, a set of APIs are present in the spooler 106 and are triggered by the application initiated-APIs and used to provide information to the hosting process 110 and possibly other components. Further, a set of asynchronous APIs are provided by the spooler and used by the hosting process. The APIs are implemented as software code that resides on some type of computer-readable media.

Thus, as an application builds a printable job, it can utilize its notification pipe to send various notifications to the spooler (as well as other components or interested applications) for its use. In one particular embodiment described below, documents are built and described using an infrastructure that enables a very detailed description of the document or, more accurately a package that contains hierarchically-organized parts. As the document is able to be built and described at a very detailed level, so too can notifications that pertain to the production process.

Further, as the spooler processes the print job, it can send notifications to the application (and other applications that may be interested in notifications) and to the hosting process. Further, as the hosting process processes a print job, it can use the notification pipe between it and the spooler to send notifications. This provides the ability for various filters to send notifications to the spooler. As in the production side scenario, these notifications can be generated to cover very detailed aspects of the processing that takes place on the consumption side.

Before discussing an exemplary set of APIs which illustrate but one example of the robustness with which notifications can be generated, consider the following. In one embodiment, the inventive notification architecture is employed in connection with a modular content framework and document format system that defines a set of building blocks for composing, packaging, distributing, and rendering document-centered content. This system is known as Microsoft's Metro Modular Content Framework and Document Format. These building blocks define a platform-independent framework for document formats that enable software and hardware systems to generate, exchange, and display documents reliably and consistently.

In addition to this general framework and format, the inventive notification framework can be employed with a particular format, known as the reach package format, that is defined using principles of the general framework. The reach package format is a format for storing paginated documents. The contents of a reach package can be displayed or printed with full fidelity among devices and applications in a wide range of environments and across a wide range of scenarios.

To provide some context for an appreciation of the inventive notification mechanism, the discussion below first provides a high level overview of the modular content framework under the section entitled "General Framework". After this section, a section entitled "The Reach Package" provides a high level overview of the reach package format. For additional information on these formats, the reader is referred to the following U.S. patent applications, which are hereby incorporated by reference: U.S. application Ser. Nos. 10/836,327; 10/836,326; 10/837,041; 10/836,608; 10/837,040; 10/837,043; and 10/837,042.

General Framework

Figure 2:
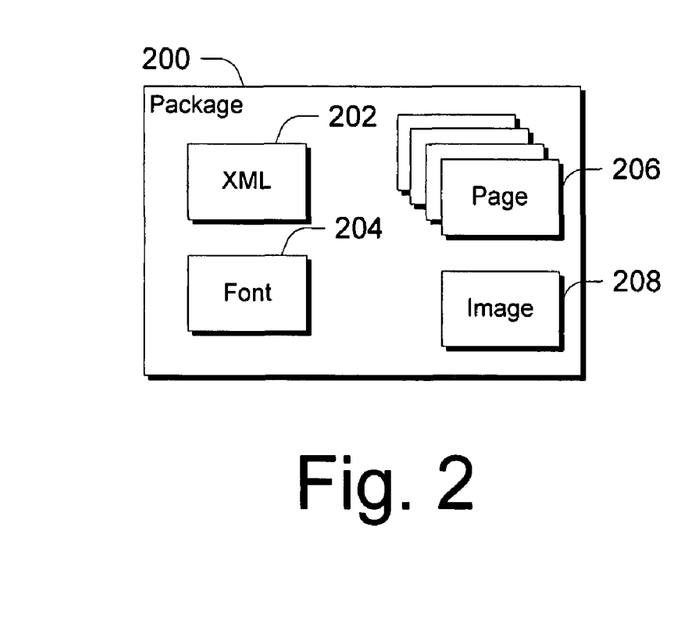
FIG. 2 is a block diagram of an exemplary printable package in connection with which various embodiments can be employed.

The general framework referenced above makes use of package model in which content is held within a package. A package is a logical entity that holds a collection of related parts. One purpose of the package is to gather up all of the pieces of a document (or other types of content) which have some logical relationship to each other, into one object that is easy for programmers and end-users to work with. For example, consider FIG. 2 which illustrates an exemplary package 200 holding a document comprising a number of parts including an XML markup part 202 representing the document, a font part 204 describing a font that is used in the document, a number of page parts 206 describing pages of the document, and a image part 208 representing an image within the document. The XML markup part 202 that represents a document is advantageous in that it can permit easy searchability and referencing without requiring the entire content of a package to be parsed.

Throughout this description, the notion of readers (also referred to as consumers) and writers (also referred to as producers) is introduced and discussed. A reader, as that term is used in this document, refers to an entity that reads modular content format-based files or packages. A writer, as that term is, used in this document, refers to an entity that writes modular content format-based files or packages. In the FIG. 1 example, the applications on the production side 102 can be considered as writers, and the spooler and related components such as the hosting process on the consumption side 104 can be considered as readers.

In accordance with at least one embodiment, a single package contains one or more representations of the content held in the package. Often a package will be a single file, also referred to as a container.

A package is a logical entity that may be represented physically in a variety of ways (e.g., without limitation, in a single file, a collection of loose files, in a database, ephemerally in transit over a network connection, etc.). Thus containers hold packages, but not all packages are stored in containers.

An abstract model describes packages independently of any physical storage mechanism. For example, the abstract model does not refer to "files", "streams", or other physical terms related to the physical world in which the package is located.

In the general framework context, a part comprises common properties (e.g., a name) and a stream of bytes. In addition to its content, each part has some common part properties. These include a name—which is the name of the part, and a content type—which is the type of content stored in the part. Parts may also have one or more associated relationships.

Part names are used whenever it is necessary to refer in some way to a part. In the illustrated and described embodiment, names are organized into a hierarchy, similar to paths on a file system or paths in URIs. Below are examples of part names:

---

/document.xml
/tickets/ticket.xml
/images/march/summer.jpeg
/pages/page4.xml

---

The segments of the names of all parts in a package can be seen to form a tree. This is analogous to what happens in file systems, in which all of the non-leaf nodes in the tree are folders and the leaf nodes are the actual files containing content. These folder-like nodes (i.e., non-leaf nodes) in the name tree serve a similar function of organizing the parts in the package. It is important to remember, however, that these "folders" exist only as a concept in the naming hierarchy—they have no other manifestation in the persistence format.

In the illustrated and described embodiment, every part has a content type which identifies what type of content is stored in a part. Examples of content types include:

---
image/jpeg
text/xml
text/plain; charset="us-ascii"
---

Parts in a package may contain references to other parts in that package. In general, however, these references are represented inside the referring part in ways that are specific to the content type of the part; that is, in arbitrary markup or an application-specific encoding. As such, the general framework uses relationships to identify relationships between parts and to describe the nature of those relationships. In one embodiment, the relationships are represented in XML as individual parts. Each part in the container that is the source of one or more relationships has an associated relationship part; this relationship part holds the list of relationships for the source part.

The general framework defines two mechanisms for building higher-order structures from parts: selectors and sequences.

A selector is a part which "selects" between a number of other parts. For example, a selector part might "select" between a part representing the English version of a document and a part representing the French version of a document. A sequence is a part which "sequences" a number of other parts. For example, a sequence part might combine (into a linear sequence) two parts, one of which represents a five-page document and one of which represents a ten-page document.

These two types of composition parts (sequence and selector) and the rules for assembling them comprise a composition model. Composition parts are described using a small number of XML elements, all drawn from a common composition namespace. For additional information on an exemplary composition model, the reader is referred to the patent applications referenced above.

The general framework utilizes descriptive metadata parts that can be used to provide writers or producers of packages with a way in which to store values of properties that enable readers of the packages to reliably discover the values. These properties are typically used to record additional information about the package as a whole, as well as individual parts within the container. For example, a descriptive metadata part in a package might hold information such as the author of the package, keywords, a summary, and the like.

In the context of the general framework, the descriptive metadata is expressed in XML, is stored in parts with well-known content types, and can be found using well-known relationship types. For additional information on descriptive metadata, the reader is referred to the patent applications referenced above.

Figure 3:
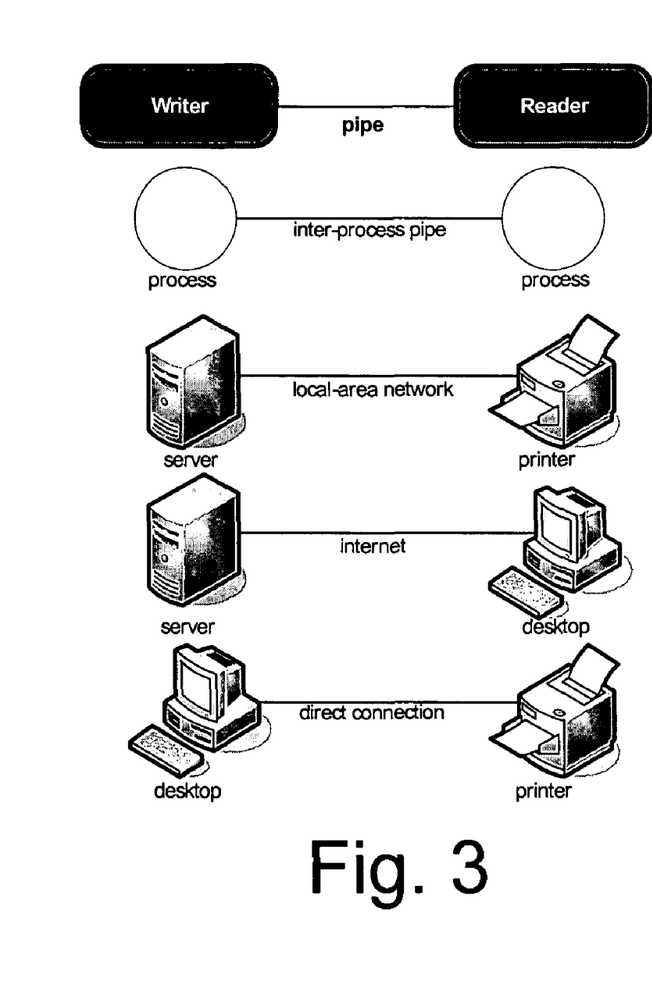
FIG. 3 illustrates some examples of various writers and readers working together to communicate about a package and illustrates various environments in which the inventive principles can be employed.

The general framework is built upon and appreciates a physical model which defines various ways in which a package is used by writers and readers. This model is based on three components: a writer, a reader and a pipe between them. FIG. 3 shows some examples of writers and readers working together to communicate about a package.

The pipe carries data from the writer to the reader. In many scenarios, the pipe can simply comprise the API calls that the reader makes to read the package from the local file system. This is referred to as direct access.

Often, however, the reader and the writer must communicate with each other over some type of protocol. This communication happens, for example, across a process boundary or between a server and a desktop computer. This is referred to as networked access and is important because of the communications characteristics of the pipe (specifically, the speed and request latency).

In order to enable maximum performance, physical package designs consider support in three important areas: access style, layout style and communication style. For additional information on each of these styles, the reader is referred to the patent applications incorporated by reference above.

Having described and made reference to a general framework, the discussion that follows describes a specific framework that is built in accordance with the principles of the general framework.

The Reach Package

A Metro payload is a collection of parts, including an identifiable "root" part and all the parts required for valid processing of that root part. For instance, a payload could be a fixed-layout representation of a document, a reflowable representation, or some other arbitrary representation.

Below is a description of a particular representation called the fixed payload. A fixed payload has a root part FixedDocumentSequence which can reference multiple FixedDocument parts, which in turn can reference multiple FixedPage parts. The package can also contain image parts and font parts that are referenced by FixedPage parts. Together, these describe a precise rendering of a multi-page reach payload.

A package which holds at least one fixed payload, and follows other rules described in the patent applications referenced above, is known as a reach package. Readers and writers of reach packages can implement their own parsers and rendering engines, based on this specification of the reach package format.

Using known rendering rules, reach packages can be unambiguously and exactly reproduced or printed from the format in which they are saved, without tying client devices or applications to specific operating systems or service libraries. Additionally, because the reach package is expressed in a neutral, application-independent way, the content can be viewed and printed without the application used to create the package. The key to this ability is the fixed payload contained in the reach package.

A fixed payload has a fixed number of pages, and page paginations are always the same. The layout of all the elements on a page in a fixed payload is predetermined. Each page has a fixed size and orientation. No layout calculations have to be performed—content can just be rendered. This applies not just to graphics, but to text as well, which is represented in the fixed payload with precise typographic placement. The content of a page (text, graphics, images) is described using a powerful but simple set of visual primitives.

Reach packages support a sequencing part, the FixedDocumentSequence, for gluing together a set of FixedDocuments into a single, larger "document." For example, an end user may want to glue together two documents that came from different sources: a two-page cover memo (a FixedDocument) and a twenty-page report (a FixedDocument).

In addition to this simple use of FixedDocumentSequence for composition in a reach package, FixedDocumentSequences can also contain further FixedDocumentSequences, allowing for complex, hierarchical reach packages.

Reach packages also support PrintTickets. A PrintTicket provides settings that should be defined by reach package writers. PrintTickets within a reach package must be processed when the package is printed. PrintTickets can be attached in a variety of ways to achieve substantial flexibility. A PrintTicket can be "attached" to an entire package and its settings will affect the whole package. PrintTickets can be further attached at lower levels in the structure (e.g., to individual pages or individual documents) and these PrintTickets will provide override settings to be used when printing the part to which they are attached.

A fixed payload is a payload whose root part is a FixedDocumentSequence part. There can be more than one fixed payload in a reach package.

A specific relationship type is defined to identify the root of a fixed payload within a reach package: the Reach Package Start Part. Consumers of reach packages (viewers or printers) use the Reach Package Start Part to find the fixed payload in the package.

The Reach Package Start Part must point to the <FixedDocumentSequence> or <FixedDocument> element that identifies the beginning of the fixed payload.

The payload includes the full closure of all of the parts required for valid processing of the FixedDocument. All content to be rendered must be contained in the reach package, including: the FixedDocument itself, all FixedPages referenced from within the FixedDocument, all image parts referenced by any of the FixedPages in the payload, all font parts referenced by any of the FixedPages in the payload, any PrintTickets attached to any part in the fixed payload, and any Annotations parts attached to the fixed payload.

The table below lists the valid part types that can be found in a reach package.

| Part | Description |
| --- | --- |
| FixedDocumentSequence | Specifies a sequence of FixedDocuments, adding a higher level of organization to the package. |
| FixedDocument | Each FixedDocument glues together a set of FixedPages in order. |
| FixedPage | Each FixedPage part represents the content of a page. |
| Font | Fonts MUST be embedded in a package to ensure reliable reproduction of the glyphs. |
| Image | Image parts MAY be included. |
| Thumbnail | A Thumbnail MAY be included to help end users identify package contents. |
| PrintTicket | PrintTickets MAY be included to provide settings to be used when printing the package. |
| Annotations | Annotations MAY be included. |

The markup in a FixedDocument part brings the pages of a document together to a common, easily-indexed root using the <FixedDocument> and <PageContent> elements.

Each FixedPage part represents a page's contents in a <FixedPage> element with <Path> and <Glyphs> elements (which are together the base for all marks rendered on a FixedPage), and the <Canvas> element to group them.

The FixedDocumentSequence part is used to bind a set of FixedDocuments into a single, larger document. For example, a printing client can use the FixedDocumentSequence part to roll-up multiple documents from various sources into a single package before sending the contents to the printer.

The document structure of the Metro fixed payload identifies FixedPages as part of a FixedDocument. Each <PageContent> element in the <FixedDocument> references by name (URI) a FixedPage part. Each FixedPage part contains FixedPage markup describing the rendering of a single page of content.

Images in JPEG, PNG, and TIFF formats can be used in reach packages. Images must use the required-resource relationship.

Thumbnail images may be attached using a relationship to the FixedDocument, FixedDocumentSequence, or FixedPage parts in the reach package. Only one thumbnail per part is allowed. For FixedDocuments and FixedDocumentSequences, a thumbnail image may be attached to assist someone using a consuming application in identifying the contents of the document. For example, a thumbnail may be a snapshot of the first page of the document, helping the user to choose the desired document from a list of document thumbnails.

For FixedPages, thumbnail images may be used that are snapshots of the contents of the FixedPage. These thumbnails can enable a user of a viewing application to choose the page to view.

Font parts are referenced using the FontUri attribute of the <Glyphs> element.

The purpose of the PrintTicket part is to provide user intent and device configuration information to printing consumers. PrintTicket parts can only be attached to FixedDocumentSequence, FixedDocument and FixedPage parts in the reach package Reach producers and consumers may include support for storing annotations of a Metro reach document alongside the reach payload itself. Annotations are considered to be Ignorable by default.

For additional information on the reach document and general framework, the reader is referred to the Applications mentioned above.

Exemplary Notification API

In one embodiment, the inventive notification architecture and APIs can be used in connection with systems such as those described in the sections entitled "General Framework" and "The Reach Package". It is to be appreciated and understood, however, that the inventive principles can be employed in connection with systems that are different from the systems described in these sections.

In accordance with one embodiment, as an application builds a particular document or writes to a file, the application can call methods and/or functions of an associated API to inform the spooler of its progress. In the context of a reach package, and because of the granularity at which a document's content can be described, these notifications can extend to very low levels. In addition, these notifications can be generated and sent at any suitable time during the application's processing of the document.

For example, as the application processes or otherwise builds a document, it can continuously generate notifications that pertain to the print job itself, the document (or sequence of documents), the particular rendition of the document (e.g. different language versions of the document, or documents formatted for different paper sizes like letter, A4, and the like), individual pages of the document and various properties and characteristics of individual pages (e.g. particular images, fonts and the like).

As an exemplary API that illustrates different levels at which notifications can take place, consider the API just below:

```
HRESULT
ReportJobProcessingProgress(
    HANDLE                  printerHandle,
    PrintJob                jobIdentifier,
    EPrintJobOperation      jobOperation,
    EPrintNotificationType  type,
    EPrintNotificationEvent event,
    PrintPropertiesCollection *pCollection
    );
typedef enum
{
    kJobProduction,
    kJobConsumption
} EPrintJobOperation;
typedef enum
{
    kJob,
    kDocument,
    kRendition,
    kPage,
    kFont,
    kJobError,
    ...         <- this means it can be extended in the future
} EPrintNotificationType;
typedef enum
{
    kAdded,
    kCommited,
    kClosed,
    kLoaded,
    kDone,
    kBlackWhitePage,
    kColorPage,
    kNotEnoughMoney,
    kTooMuchColor,
    ...         <- this means it can be extended in the future
} EPrintNotificationEvent;
ReportJobProcessingProgress(
    hPrinter,
    jobId,
    kJobProduction,
    kFont,
    kAdded,
    pCollection); <- details, such as font size
ReportJobProcessingProgress(
    hPrinter,
    jobId,
    kJobProduction,
    kJobError,
    kTooMuchColor,
    pCollection); <- details about what page caused the error
```

In the example just above, the API can be utilized for generating and receiving notifications that pertain to both job production and job consumption. The notification enumerations indicate what notifications pertain to, as well as the event that was generated. In addition, it is to be appreciated and understood that the above-described API is extensible, which provides added flexibility.

Further, the function calls that are listed (i.e. ReportJobProcessingProgress) are the functions that are used by the application or a filter to call the API. Specifically, the first-listed function call is used by the application to call the API; and, the second-listed function call is used by a filter to call the API.

Thus, in this example, the API can be used to generate notifications associated with particular print jobs (such as when a job is added, committed, closed, loaded and done), documents (such as when a document is added, committed, closed, loaded and done), document renditions (such as when a document rendition is added, committed, closed, loaded and done), and/or page (such as when a page is added, committed, closed, loaded and done), to name just a few. The progress of a particular item has both internal and external relevance.

Internally, the rich notifications can help the spooler make better scheduling decisions for consumption. For example, if the filter hosting process needs a certain page that is not yet available, it can launch an asynchronous read call and wait in a state where it consumes almost no resources. When the application notifies the spooler that that specific page is available, the spooler can satisfy the pending read call. Externally, the relevance of an item's progress depends on what meaning the user or application writer assigns to the various events.

Thus, in this example, the application can provide notifications in a stepwise manner as each portion or sub-portion of a job, document, rendition or page is processed. In addition, as a document is capable of being described at very low levels (as in the example of reach packages), these notifications can be generated at comparably low levels as well (such as at the individual parts or parts characteristics level).

For example, consider the following. Assume that a home user is printing photographs using, for example, Microsoft Digital Image Suite. In this case, the user selects a few images to print and the application creates a Reach document with the images that are to be printed. The user then emails or otherwise transmits the Reach package to the print provider. The print provider then loads the file in an application and selects "print". Now, as the application processes the images, it reports the progress of every image being submitted, and the spooler reports the progress of every image being consumed.

As further examples, consider the following. Consider first an example in the context of printing that takes place in connection with financial accounting, such as institutional financial accounting. Assume that an institution employs a business model that charges users for what they print. A certain institutional software system keeps track of the money that a user has in his/her account. A filter in the pipeline is designed to interact with this institutional system and withdraw money whenever a page is printed. If the user runs out of money while a job is being printed, the filter sends the kNotEnoughMoney notification to the spooler and the spooler to the interested parties. The user can then add money to the account and resume the print job.

Consider further an example in the context of a print job that is color intensive. Assume a school has a print system in which a filter in the pipeline checks how much color is used per page. If the filter determines that a page uses too much color, it sends the kTooMuchColor notification along with the information about what page caused the error. The user can try printing again at a lower quality or reduced size.

Consider now an example of a non-GUI notification application. Assume a monitoring application registers for notifications with every print server in an organization. This application then receives notifications from the print servers and uses the notifications to create reports about: how many jobs and pages were printed, how many bytes were printed, how many pages contained color (e.g. using kBlackWhitePage and kColorPage). The application can further use the notifications to break down the number of pages/images printed per user. This is possible because each event can carry additional information, so that the spooler can specify the user name in the notification data. Essentially then, this application helps in the study of printing patterns in the organization.

The above-described API can be utilized on the production side so that the producing application can generate and send the notifications to any interested entities that may have registered for notifications, e.g. the spooler and hosting process.

Similarly, the hosting process can utilize these APIs as it processes data on the consumption side. For example, as particular filters of the hosting process process individual portions of a print job or document, the hosting process can use the APIs to inform the spooler of its progress which, in turn, can inform any entities that may have registered for notifications (such as the application or a user interface component of the application).

Exemplary Hosting Process

Figure 4:
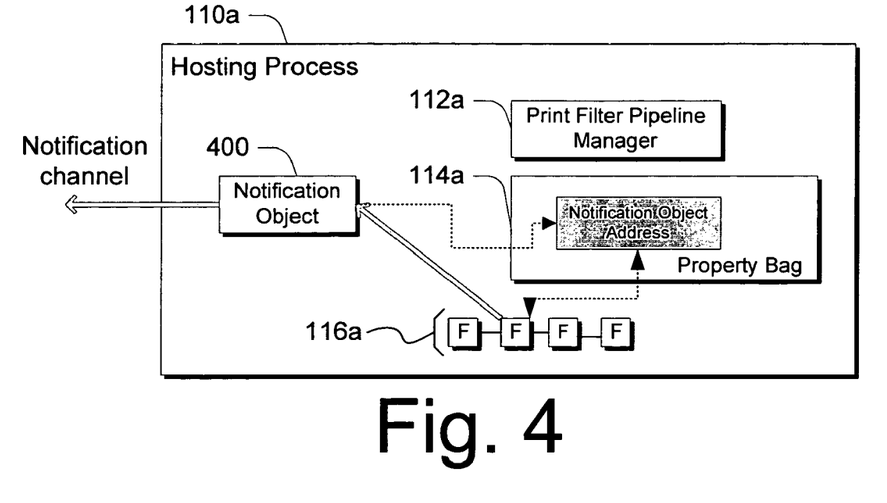
FIG. 4 is a block diagram of an exemplary hosting process in accordance with one embodiment.

FIG. 4 illustrates an exemplary hosting process in accordance with one embodiment. In this example, like components from the FIG. 1 system have been utilized, where appropriate, with numerical designators that utilize the suffix "a". Accordingly, in this example, hosting process 110a includes a print filter pipeline manager 112a, property bag 114a and filter collection 116a. In this example, pipe manager oversees and manages filter collection 116a.

In this example, individual filters can be responsible for activities such as reading data from the spooler file, attaching metadata to the job, transforming the job into some other format, rendering the print job into a form (such as a PDL) that is recognized by a printing device, providing the rendered print job data to the spooler for provision to a printing device, and the like.

In addition to these components, a notification object 400 is provided. In this particular example, the notification object is provided to abstract away the notification API described above. Specifically, the notification object is provided so that the hosting process can run down level. By abstracting away the notification API in a manner that enables the hosting process to run down level, filters that are running on a downlevel platform that does not support the rich notification mechanism can continue to function and make spooler calls in the manner in which their designers intended. On downlevel systems then, the spooler may ignore calls for notifications.

The property bag 114a essentially comprises a collection of items or properties and provides a means for individual filters to communicate out of band. In at least some embodiments, a property bag is an object which implements an interface through which callers can add, delete, and search for (keyword, value) pairs. Examples of items that can be placed in a property bag include, without limitation: ("security token", handle), where the handle is a token handle created by an operating system; ("notification interface", pointer), where the pointer is a certain notification interface. This interface is used by the filters to generate notifications.

Thus, the property bag is a means or discovery mechanism through which interested filters are given access to the notification object 400.

In operation, the property bag 114a has an interface that can be queried for a notification interface. Typically, this interface is queried by the rendering filter. Print filter pipeline manager 112a creates the notification object 400 which supports the notification interface. The notification object is designed to be knowledgeable of the platform with which it communicates. Accordingly, the notification object can work downlevel, which means that it can receive notification calls from the individual filters of the filter collection and can then call old APIs in the spooler that do not support the rich notification interface described above. Alternately, the notification object can, when appropriate, make API calls to the inventive notification interface described above.

Using the hosting process and, in particular the notification object, notifications generated by the filters can be passed, via the inventive notification API, to the spooler where appropriate internal job structures can be updated and clients and requesting entities can be notified on the progress of the print job's consumption. In the illustrated and described embodiment, the spooler utilizes an asynchronous notification process to receive rich information about the print job.

By abstracting away the notification API, the same filter package can work with different platforms, e.g. ones that support the inventive notification interface, and ones that do not.

Exemplary Timeline

Figure 5:
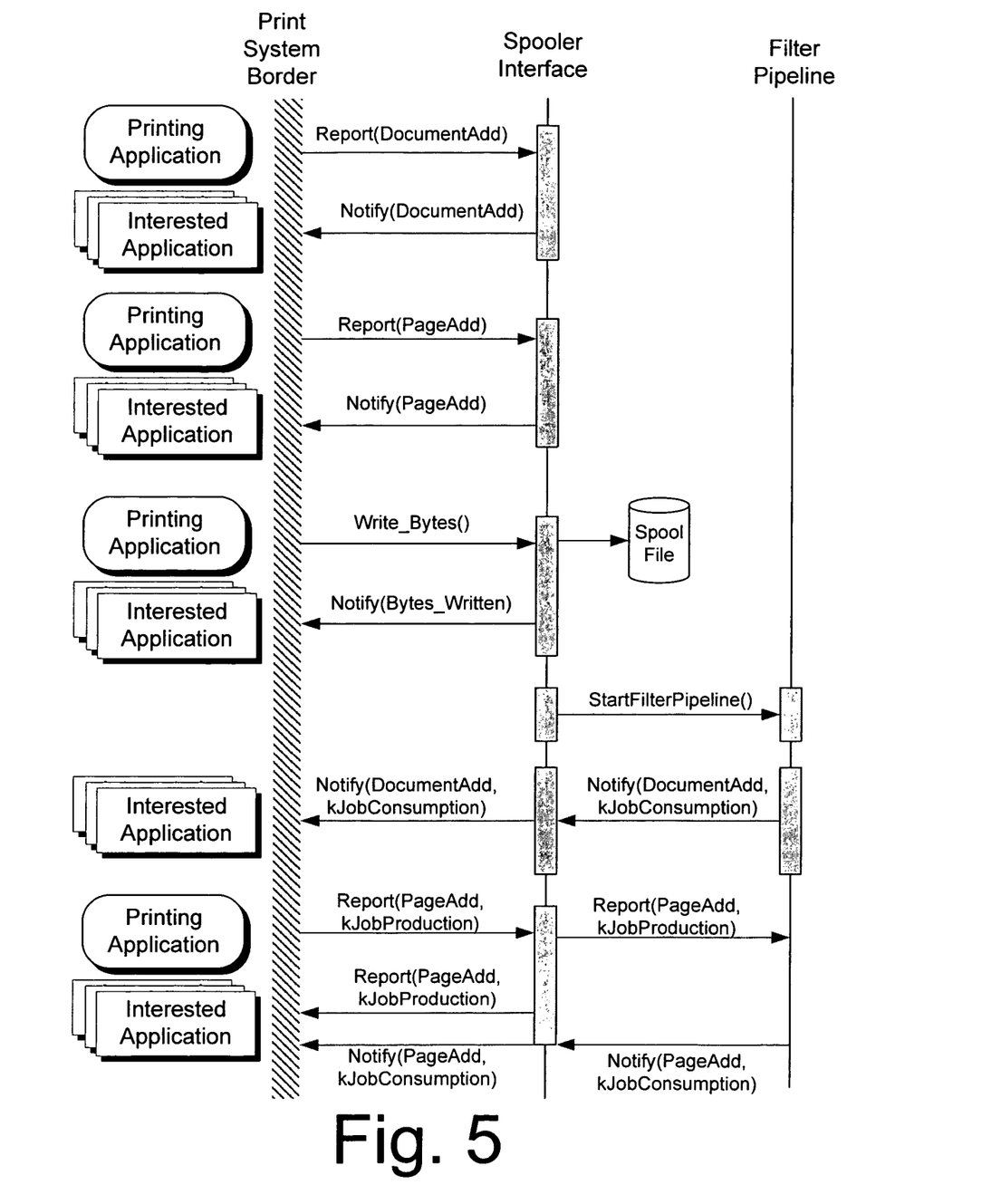
FIG. 5 is an exemplary timeline that describes how the inventive notification system can be utilized in accordance with one embodiment.

FIG. 5 shows an exemplary timeline that illustrates how the above described API can be used to generate, send and receive rich notifications. The illustration is generally self-explanatory, but for purposes of explanation, consider the following.

FIG. 5 shows, on the left side, a printing application and one or more interested applications. Interested applications can include those applications which may not necessarily be the printing application, but yet are interested in receiving notifications. The spooler interface is shown in the middle of the illustration both receiving and generating calls—both from and to the printing application and interested applications, and from and to the filter pipeline. On the right side of the illustration is the filter pipeline.

As shown, the printing application can call the spooler interface to add a document for printing and individual pages for printing and receive, responsive to those calls, corresponding notifications. As the application continues to call the API to write bytes for the print job, it can continue to receive associated notifications from the spooler.

The spooler can make a call on the filter pipeline to start the pipeline and, responsive to those calls, receive notifications from the filter pipeline which, in one embodiment, can take place as described above. Responsive to receiving notifications from the filter pipeline, notifications can be generated for interested applications that may have registered for such notifications. Some examples of interested applications are given above.

CONCLUSION

The embodiments described above provide a notification mechanism that extends from the printing application to the spooler, from the spooler to the hosting process and back to the spooler. The notification mechanism can allow interested applications, such as print user interfaces, to register to receive updates on the progress of a print job. The notification mechanism provides a very rich and robust mechanism through which notifications can be generated and sent within the system.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
    a first notification pipe between an application and a print spooler;
    at least a second notification pipe between a hosting process and the spooler; and
    wherein the first notification pipe and the second notification pipe,
        can be utilized to send notifications that pertain to print jobs, documents, renditions of documents, and individual pages of individual documents, and
        are implemented as a set of APIs comprising:
            a first set of application initiated APIs present in an application address space utilized to create a printable job and to generate a notification associated with a specific print job, a specific document, or an individual page of an individual document;

a second set of APIs present in the spooler and triggered by the application initiated APIs to provide information to at least the hosting process; and a third set of asynchronous APIs presented by the spooler and utilized by the spooler to enable a scheduling decision for consumption.

2. The system of claim 1, wherein the notifications can pertain to when a print job is added, committed, closed, loaded or done.

3. The system of claim 1, wherein the notifications can pertain to when a document is added, committed, closed, loaded or done.

4. The system of claim 1, wherein the notifications can pertain to when a rendition is added, committed, closed, loaded or done.

5. The system of claim 1, wherein the notifications can pertain to when an individual page is added, committed, closed, loaded or done.

6. The system of claim 1, wherein the notifications can pertain to:

when a print job is added, committed, closed, loaded or done;

when a document is added, committed, closed, loaded or done;

when a rendition is added, committed, closed, loaded or done; and when an individual page is added, committed, closed, loaded or done.

7. One or more non-transitory computer-readable storage media embodying an extensible application program interface (API) associated with a modular content framework and a document format system, wherein the set of extensible API comprises:

a method or a function for reporting processing progress that pertains to a print job, wherein the method or the function is callable by a spooler that processes the print job to enable the spooler to schedule the print job for consumption, wherein the method or the function can be called to report:

at least one notification from a filter pipeline comprising a collection of filter managed by a filter pipeline manager, wherein the notification is generated for one or more registered applications, the at least one notification comprising:

progress of the print job itself;

progress of document processing;

progress of document rendition processing; or progress of processing of individual pages of individual documents, wherein, the at least one notification is provided in a stepwise manner as a portion or a sub-portion of the print job, the document processing, the document rendition processing or the processing of the individual pages of the individual documents is processed, wherein the set of extensible API implements the method or function using:

a first set of application initiated APIs present in an application address space utilized to create a printable job and to generate a notification associated with a specific print job, a specific document, or an individual page of an individual document;

a second set of APIs present in the spooler and triggered by the application initiated APIs to provide information to at least the hosting process; and a third set of asynchronous APIs presented by the spooler and utilized by the spooler to enable a scheduling decision for consumption.

8. The one or more non-transitory computer-readable storage media of claim 7, wherein the method or function can be called to report when a print job is added, committed, closed, loaded or done.

9. The one or more non-transitory computer-readable storage media of claim 7, wherein the method or function can be called to report when a document is added, committed, closed, loaded or done.

10. The one or more non-transitory computer-readable storage media of claim 7, wherein the method or function can be called to report when a rendition is added, committed, closed, loaded or done.

11. The one or more non-transitory computer-readable storage media of claim 7, wherein the method or function can be called to report when an individual page is added, committed, closed, loaded or done.

12. The one or more non-transitory computer-readable storage media of claim 7, wherein the method or function can be called to report:

when a print job is added, committed, closed, loaded or done;

when a document is added, committed, closed, loaded or done;

when a rendition is added, committed, closed, loaded or done; and when an individual page is added, committed, closed, loaded or done.

13. One or more non-transitory computer-readable storage media embodying software code implementing a print system hosting process comprising:

a filter pipeline manager for managing a collection of filters, wherein the collection of filters comprises at least a filter responsible for reading data from a spooler file, a filter rendering the print job into a form recognizable by a printing device, or another filter providing the rendered print job data to a spooler;

a property bag comprising:

a collection of items enabling an individual filter to communicate out of band, the items comprising at least a notification security token and a handle, or a notification interface and a pointer; and an interface that can be queried by a rendering filter for a notification interface; and a notification object that supports the notification interface, wherein the notification object is configured so that the hosting process can run downlevel, receiving a notification call from one or more individual filters of the collection of filter.

14. The one or more non-transitory computer-readable storage media of claim 13, wherein the notification object can be used to send notifications from the hosting process to a print spooler, wherein the notifications can pertain to print jobs, documents, renditions of documents, and individual pages of individual documents that are processed by the hosting process.

15. The one or more non-transitory computer-readable storage media of claim 14, wherein the notifications can pertain to:

when a print job is added, committed, closed, loaded or done; and when a document is added, committed, closed, loaded or done.

16. The one or more non-transitory computer-readable storage media of claim 14, wherein the notifications can pertain to:
  when a print job is added, committed, closed, loaded or done; and
  when a document is added, committed, closed, loaded or done;
  when a rendition is added, committed, closed, loaded or done; and
  when an individual page is added, committed, closed, loaded or done.

* * * * *